United States Patent
Hunt et al.

(10) Patent No.: US 9,637,967 B2
(45) Date of Patent: May 2, 2017

(54) ELECTRICALLY POWERED VEHICLE TAILGATE OPERATOR

(71) Applicant: Kiekert AG, Heiligenhaus (DE)

(72) Inventors: Robert J. Hunt, Davisburg, MI (US); Kyle Schroeder, St. Charles, MI (US)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 14/795,208

(22) Filed: Jul. 9, 2015

(65) Prior Publication Data

US 2017/0009508 A1    Jan. 12, 2017

(51) Int. Cl.
*E05F 15/627* (2015.01)
*B62D 33/027* (2006.01)

(52) U.S. Cl.
CPC ........ *E05F 15/627* (2015.01); *B62D 33/0273* (2013.01); *E05Y 2900/546* (2013.01)

(58) Field of Classification Search
CPC ...... B60J 5/108; B62D 33/023; B62D 33/027; B62D 33/0273; B62D 33/03; E05F 15/611; E05F 15/614; E05F 15/627
USPC ........................... 296/50, 56, 57.1
See application file for complete search history.

(56) References Cited

U.S. PATENT DOCUMENTS

| | | | |
|---|---|---|---|
| 5,449,212 A | 9/1995 | Seifert | |
| 5,896,703 A * | 4/1999 | Wright | E05F 15/627 192/48.2 |
| 6,068,321 A * | 5/2000 | Ooms | B62D 33/0273 296/146.4 |
| 7,287,803 B2 | 10/2007 | Koneval et al. | |
| 7,357,435 B2 * | 4/2008 | Robertson | B60R 25/1001 296/146.4 |
| 8,764,090 B2 * | 7/2014 | Kerr | E05F 15/627 296/146.4 |
| 2005/0155289 A1 * | 7/2005 | Oberheide | E05F 1/1091 49/340 |
| 2010/0133372 A1 * | 6/2010 | Ying | B66D 1/04 242/395 |
| 2014/0021736 A1 * | 1/2014 | Chenowth | H02H 7/0855 296/100.11 |

* cited by examiner

*Primary Examiner* — Jason S Daniels
(74) *Attorney, Agent, or Firm* — Renner, Otto, Boisselle & Sklar, LLP

(57) ABSTRACT

An electrically powered vehicle tailgate operator for pivoting a tailgate of a pickup truck about a horizontal tailgate axis near a bottom edge of the tailgate. The vehicle tailgate operator comprises a cable spool for spooling a cable and a drive gear for transmitting torque from the drive shaft to the cable spool. The vehicle tailgate operator also has a retention system. The cable spool, the drive actuator, the drive shaft, the drive gear, and the retention system are arranged inside of a housing, wherein the spool axis is oriented in parallel to the drive shaft axis and the spool axis is arranged on the same height or above the drive shaft axis.

19 Claims, 3 Drawing Sheets

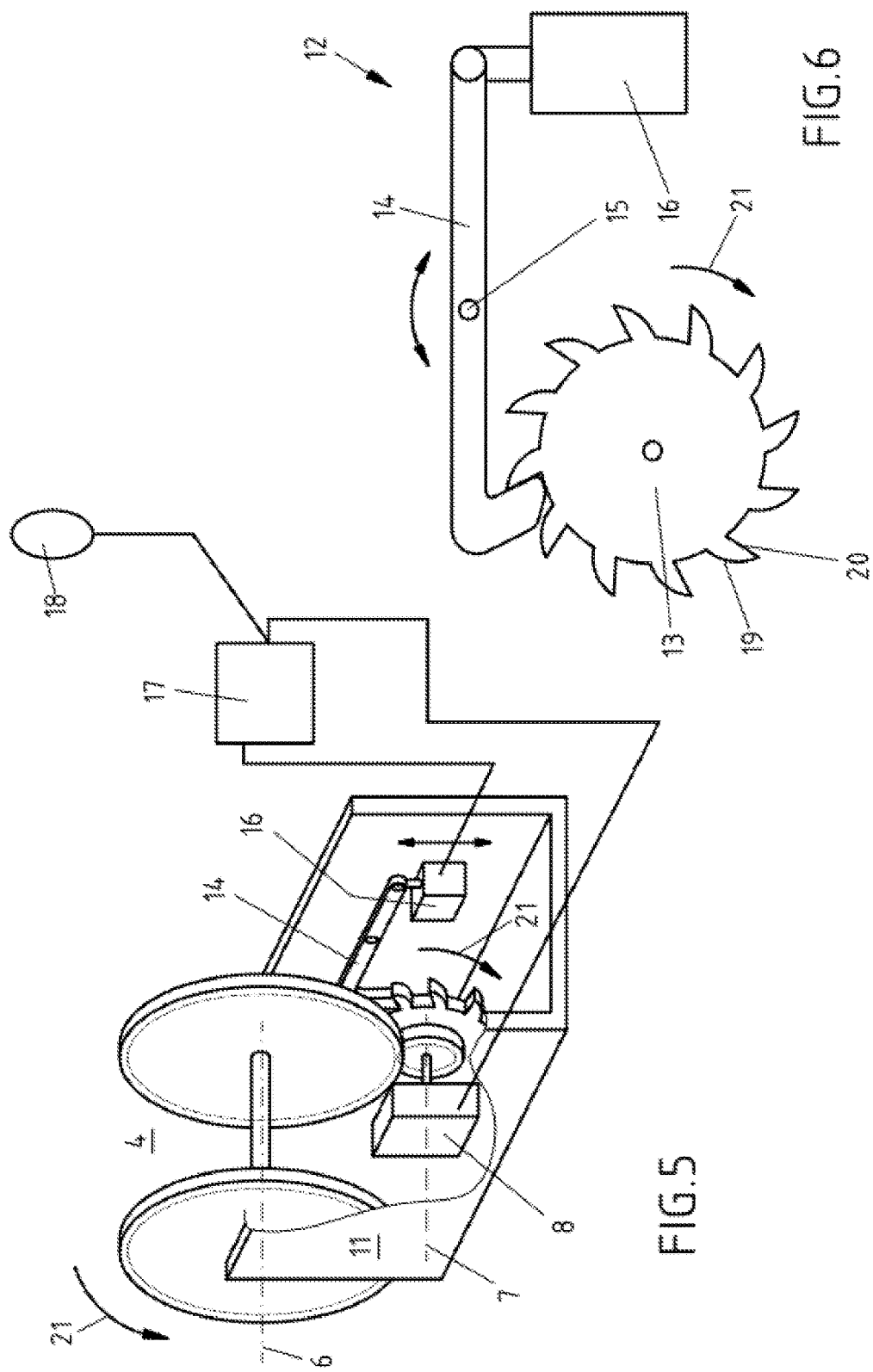

ELECTRICALLY POWERED VEHICLE TAILGATE OPERATOR

Figure 1:
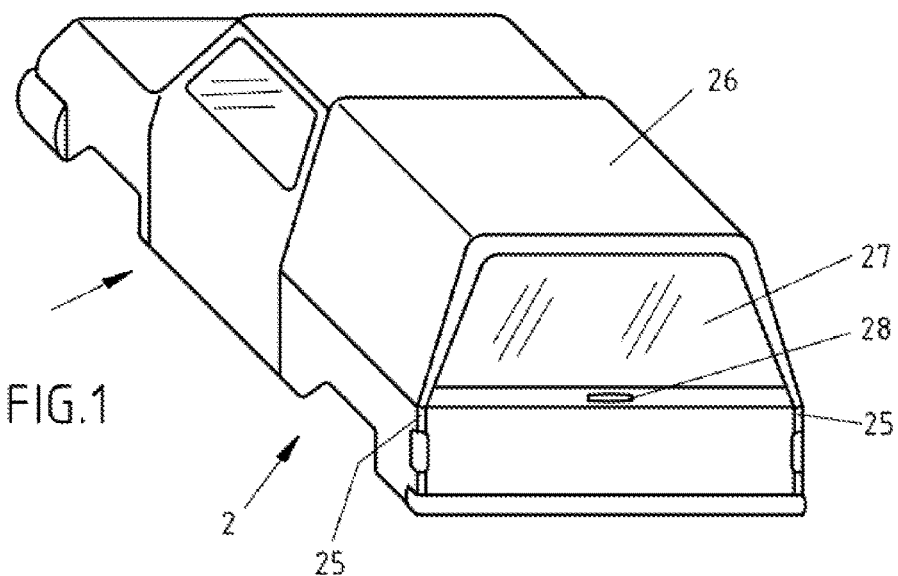

The invention concerns an electrically powered vehicle tailgate operator for pivoting a tailgate of a pickup truck.

A pickup truck commonly provides a pickup truck bed for carrying load. A rear tailgate provides access to the pickup truck bed, which is generally not provided with power actuators for opening and closing the tailgate. In order to increase safety, convenience and thus attractiveness of a pickup truck to a broad range of motor vehicle users, a simple technical solution is needed that can be implemented with minor changes to an existing pickup truck bed design and little production expense.

U.S. Pat. No. 5,449,212A to Seifert and U.S. Pat. No. 7,287,803 B2 to Koneval et al. disclose electrically driven, but complex solutions for moving a tailgate of a pickup truck. The content of the cited documents is incorporated by reference herein.

The purpose of the invention is therefore to provide a further developed electrically powered vehicle tailgate operator for pivoting a tailgate of a pickup truck.

For the solution of the problem serves an electrically powered vehicle tailgate operator for pivoting a tailgate of a pickup truck according to the main claim. Preferred embodiments are described in the dependent claims.

The problem is solved by means of an electrically powered vehicle tailgate operator for pivoting a tailgate of a pickup truck about a horizontal tailgate axis near a bottom edge of the tailgate between a generally vertical closed position for prohibiting access to a pickup truck bed, and a generally horizontal open position for providing access to the pickup truck bed; the vehicle tailgate operator comprising a cable spool for spooling a cable by means of rotation about a spool axis, an electrical drive actuator for pivoting a drive shaft about a drive shaft axis, and a drive gear for transmitting motion and/or torque from the drive shaft to the cable spool, wherein at least the cable spool, the drive actuator, the drive shaft and the drive gear can be a arranged inside of a housing, wherein the spool axis is oriented in parallel to the drive shaft axis and the spool axis is arranged on the same height or above the drive shaft axis.

On the same height means that both axis are arranged on the same height on a vertical axis relative to the pickup truck bed, which enables robust mounting of the drive actuator on the housing while leaving enough space for implementing additional components such as a retention system. Having the spool axis being arranged above the drive shaft axis, more space is provided for implementing such additional components.

The electrically powered vehicle tailgate operator according to the invention enables a very simple but highly robust vehicle tailgate operator solution that can be provided highly compact and small-sized, with no or only little changes to the pickup truck bed construction and design. Such vehicle tailgate operator can be implemented with little production expense. The convenience of electrical driven operation of the tailgate with increased safety for the vehicle user can be obtained. Furthermore, remote activation and/or control from the vehicle interior as well as a connection with a central locking system of the vehicle can be enabled.

In one embodiment, the vehicle tailgate operator further comprises a retention system for retaining and/or locking the tailgate in the closed position, the retention system comprising a ratch wheel, a retention lever for interlocking the ratch wheel and an electrical retention actuator for pivoting the retention lever.

The vehicle tailgate operator having such composed retention system enables very robust, reliable and safe retention of the tailgate and/or locking of the tailgate in the closed position. In contrast to for example a latch mechanism latching with a striker in closed position, safe retention of the tailgate can also be achieved when the tailgate is not precisely closed, meaning arranged in vertically, maybe due to oversized load for the pickup truck bed that block the tailgate from reaching the vertical close position. In such case, a latching mechanism will fail but the described retention system will still assure safe hold of the tailgate during driving the vehicle. Safe and reliable retention in any position of the tailgate can be achieved, thus maximizing the risk of load on the pickup truck bed to slide of the pickup truck bed on the street during driving.

In one embodiment, the retention actuator of said retention system can be connected to a control unit of the vehicle tailgate operator such way that the tailgate is retained when the tailgate cannot be pivoted further towards the vertical close position.

This enables to safely retain the tailgate in such cases where the operator does not recognize that the tailgate is blocked from reaching the vertical closed position by an obstacle and start driving with the impression that the tailgate is closed appropriately. The risk of losing load from the pickup truck bed and to endanger other road users can be reduced.

In one embodiment, the retention lever of said retention system can rotate about a retention lever axis, which is arranged between and/or approximately centered between the ratch wheel and the retention actuator.

A very simple but robust and reliable retention mechanism can thereby be obtained with little constructed space need. In addition, just a low power retention actuator can be applied.

In one embodiment, the retention actuator can provide a linear motion and/or force, which can be transmitted to an end of the retention lever, and/or the retention lever can be mounted at the housing of the vehicle tailgate operator.

A very simple and compact mechanism with a low power retention actuator can be obtained.

In one embodiment, the ratch wheel, the retention lever for interlocking the ratch wheel and the electrical retention actuator of said retention system can be placed inside of the selfsame housing of the vehicle tailgate operator and/or the ratch wheel is mounted on the drive shaft of the drive actuator.

A very simple, but robust and compact mechanism can be obtained with few parts.

In one embodiment, the retention lever is longitudinally extending and/or has a hook-shaped or J-shaped end for directly engaging with the ratch wheel for prohibiting rotation of the tailgate towards open position.

J-shape means that the end is bent in particular by more than 90° and/or preferably less than 270°.

Very robust and reliable retention of the tailgate can be achieved.

In one embodiment, the ratch wheel of said retention system comprises teeth which have a proximate triangular shape with two opposed tooth flanks, wherein a first tooth flank is arranged ahead of second tooth flank of the same tooth in a closing rotation direction of the ratch wheel towards closed position of the tailgate, wherein the first tooth flank and/or the second tooth flank are tilted opposed to the closing rotation direction, preferably under an angle to a tangent of the ratch wheel circumference of less than 90°, in particular less than 60°.

Very robust and reliable retention of the tailgate can be achieved while reducing or eliminating the risk of interlocking of the retention lever with the ratch wheel during pivoting to closing rotation direction. Furthermore, it can be enabled that an activated retention actuator can still allow reciprocally pivoting of the retention lever during rotation of the ratch wheel in closing rotation direction.

In one embodiment, the retention actuator can be activated to transmitting motion and/or forces to the retention lever for engaging with the ratch wheel for prohibiting pivoting of the cable spool in opening rotation direction, i.e. pivoting the tailgate in the direction like from closed to open position, and/or the retention actuator can be deactivated to transmitting motion and/or forces to the retention lever for disengaging from the ratch wheel for allowing free pivoting of the cable spool in both rotation directions.

In this embodiment, activation and deactivation of the retention actuator refers to two basically opposed operation states. However, in other embodiments, the retention actuator may not apply targeted forces or motion in one specific direction when being deactivated.

Very robust and reliable retention and/or locking can thereby be achieved.

In one embodiment, said activated retention actuator can still allow reciprocally pivoting of the retention lever during rotation of the ratch wheel in closing rotation direction.

Very quick retention or locking reaction time can thereby be achieved.

In one embodiment, the gear drive comprises a gear tooth wheel that is mounted on the drive shaft and/or arranged between the drive actuator and a ratch wheel of a—or said—retention system, preferably in direct contact adjacently arranged next to ratch wheel and/or having a smaller diameter than the ratch wheel.

A very simple, compact, robust and reliable vehicle tailgate operator mechanism can be obtained.

In one embodiment, the cable spool comprising a spool shaft for fixating and spooling the cable, a first side wall disk and a second side wall disk connected through the spool shaft, wherein the spool shaft and both side wall disks being aligned along the spool axis, wherein both side wall disks having approximately the same diameter and/or one of the side wall disks having radial teeth for engaging with a gear tooth wheel.

A very simple, compact, robust and reliable vehicle tailgate operator mechanism can thereby be achieved.

In one embodiment, a gear tooth wheel has less than half, less than a third or less than a quarter of the diameter of a side wall disk of the cable spool with radial teeth for engaging with the gear tooth wheel.

Thereby, a compact construction can be achieved and a low power drive actuator can be applied.

In one embodiment, a spool shaft of the cable spool is shorter than the drive shaft and/or the spool shaft having approximately the same diameter like the drive shaft.

A compact but robust construction of the vehicle tailgate operator can thereby be achieved.

In one embodiment, the vehicle tailgate operator can be placed inside of a housing with a rectangular or square shape that extends longitudinal in vertical direction, preferably having the same height like the pickup truck bed, for forming a rear side edge of the pickup truck bed as stop surface for the tailgate in the closed position and/or is part of the pickup truck bed. In particular, said stop surface can be arranged at the inner side of the pickup truck bed side with a distance to the rear end that correspond to the thickness of the tailgate.

Vehicle tailgate operator placed inside of a housing refers to the operator components except items like the cable and eventually connection means of an electrical actuator of the operator to a control unit or a switch.

A very compact and robust vehicle tailgate operator can thereby be obtained. Only little constructed space is needed and minor changes can be sufficient for integration into an existing pickup truck bed design or construction.

In one embodiment, a spool axis can be arranged in the upper half or upper third of a height of a pickup truck bed for enabling the cable to pass through a small sized hole in the housing for connecting to the tailgate.

A simple vehicle tailgate operator with few parts and high power efficiency can be obtained. In addition, little or no change to the pickup truck bed design or construction is thereby necessary to implement the electrically powered vehicle tailgate operator.

In one embodiment, a locking latch is provided for locking the tailgate in closed position and/or which is releasable through an electrical actuator.

A safe locking of the tailgate in closed position can be achieved with high simplicity and few parts.

In one embodiment, the vehicle tailgate operator comprises a control unit and/or a sensor for recognizing the tailgate when reaching the closed position in order to deactivate the drive actuator and/or to activate retention or locking of the tailgate in the closed position.

High convenience of use can be achieved.

In one embodiment, the vehicle tailgate operator comprises a switch for opening and/or closing the tailgate, preferably from the interior of the vehicle.

Remote opening and/or closing of the tailgate or remote locking and/or retaining of the tailgate in the current or closed position is enabled for high user convenience.

In one embodiment, the vehicle tailgate operator is connectable to a vehicle central locking system for closing and/or locking or retaining the tailgate when activating central locking of the vehicle.

High convenience and safety can be obtained with little changes to an existing pickup truck central locking system.

Another aspect of the invention concerns a vehicle, truck or pickup truck with an electrically powered vehicle tailgate operator with one or more features of the electrically powered vehicle tailgate operator and the embodiments of the electrically powered vehicle tailgate operator as described above.

The features of each embodiment as well as features of the above description and the features of the figure description can be combined with each other and combined with the subject matter of the aspects of the invention and each claim.

All combinations of one or more embodiments and/or aspects of the invention with one or more claims is hereby disclosed.

Multiple variations and modifications are possible in the embodiments and between the aspects of the invention and the embodiments of the invention described herein. In some instances, some features of the present invention may be employed without a corresponding use of the other features. Accordingly, it is appropriate that the foregoing description be constructed broadly and understood as being given by way of illustration and example only, the spirit and scope of the invention being limited only be the appended claims.

Details and further advantages are provided in the following description of the figures which depicts a preferred execution example with details and individual components.

FIG. 1: Pickup truck with a cap on a pickup truck bed

Figure 2:
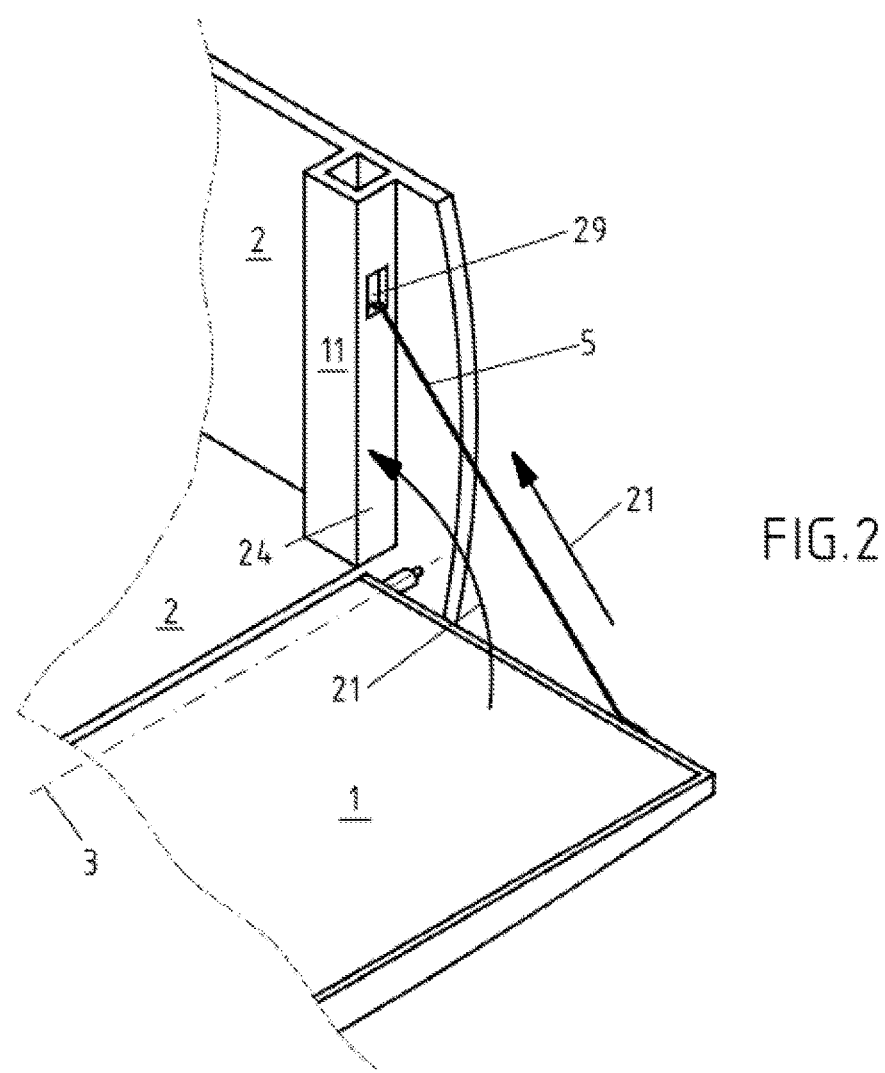

FIG. 2: Pickup truck bed with electrical powered vehicle tailgate operator

Figure 3:
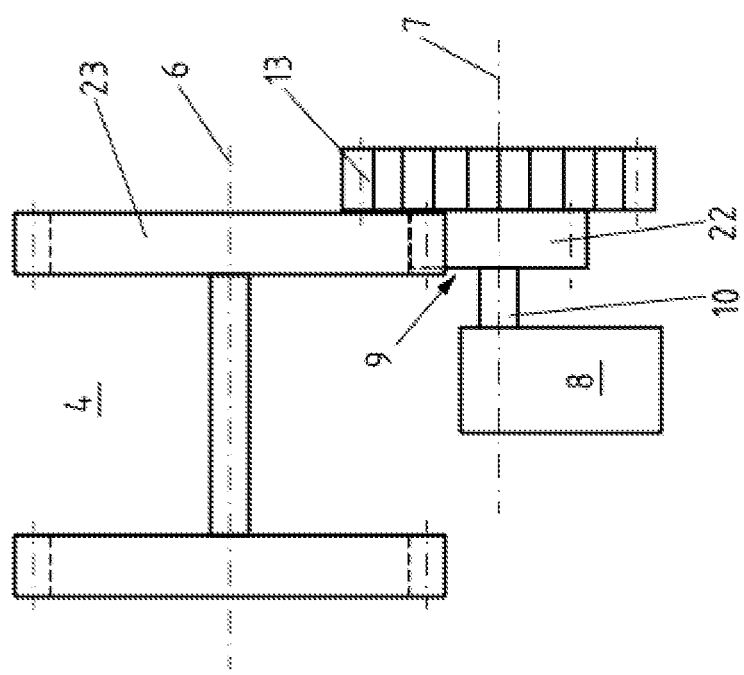

FIG. 3: Principle drawing of the electrical powered vehicle tailgate operator mechanism FIG. 4: Detailed principle drawing of the drive gear FIG. 5: Principle drawing of the electrical powered vehicle tailgate operator with retention system FIG. 6: Detailed principle drawing of the retention system FIG. 1 shows a pickup truck with a cap 26 covering the pickup truck bed 2. The cap 26 comprises a liftgate with glass 27, which can be opened through a handle 28 at the liftgate. The electrical powered vehicle tailgate operator can be integrated in a pickup truck with and without a cap 26 or topper. A locking latch 25 being arranged at the housing 11 or at the tailgate 1 can facilitate secure locking of the tailgate 1 in closed position.

FIG. 2 shows a pickup truck without cap or topper from the back side. The tailgate 1 is in a horizontal open position. An electrical powered vehicle tailgate operator mechanism is integrated in a housing 11 for enabling remote and/or automatic opening and closing of the vehicle liftgate 1 and connected to the liftgate 1 by means of a cable 5 through a hole 29 in the housing 11. The housing 11 forms a stop surface 24 for the tailgate 1 in closed position. The tailgate 1 can pivot about a tailgate axis 3 between a horizontal open position and a vertical closed position.

FIG. 3 illustrates the electrical powered vehicle tailgate operator mechanism. When the tailgate 1 is in open position as shown in FIG. 2 and a drive actuator 8 is activated, a drive shaft 10 with start rotation about the drive shaft axis 7. The gear tooth wheel 22 that is mounted on the drive shaft axis 7, will begin to rotate in closing rotation direction 21.

Figure 4:
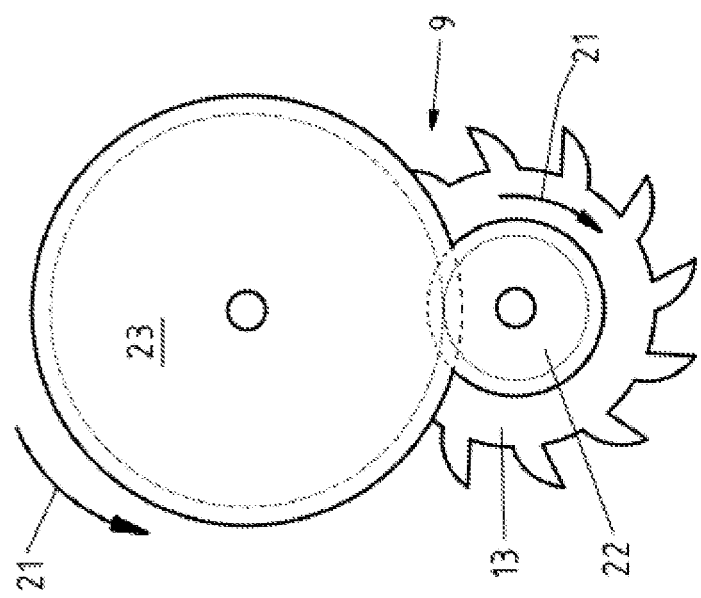

FIG. 4 shows the principle of the drive gear 9, wherein the rotation of the gear tooth wheel 22 is then transmitted to the side wall disk 23 of the cable spool 4, which then rotates in its closing rotation direction 21 about the spool axis 6. A cable 5 fixated at the spool shaft of the cable spool 4 get spooled on the spool shaft. As a result, the cable 5 get shortened accordingly and thereby pulls up the vehicle tailgate 1 into closing position. If implemented, a locking latch 25 will engage for an improved locking. Upon release of the locking latch 25, the tailgate 1 can be opened again by the reverse process.

FIG. 5 shows an electrical powered vehicle tailgate operator mechanism with a retention system 12 which can be implemented as alternative to or in addition to said locking latch 25. After having closed the tailgate 1, the retention actuator 16 can be activated either directly by a switch 18 or by a control unit 17. The retention actuator 16 will then push a retention lever 14 in a linear direction and the retention lever 14, which is mounted rotatable about a retention lever axis 15 with push on a ratch wheel 13 while getting engaged with a second tooth flank 20 of said ratch wheel 13.

As both tooth flanks 19, 20 are tilted in the same direction opposed to the closing rotation direction 21, a configuration is possible that the retention lever 14 is pushing on the ratch wheel 13 while allowing pivoting in closing rotation direction and prohibiting pivoting in opening rotation direction. Risk of injury of the user by abrupt hinging down of the tailgate 1 can thereby be nearly eliminated.

When the user is pressing the tailgate operator switch 18 to open the tailgate 1, the retention actuator 16 is deactivated for pulling back the retention lever 14 and thus allowing pivoting of the cable spool 4 in opening direction.

In general, the electrical powered vehicle tailgate operator mechanism can be implemented on both sides of the pickup truck bed 2. Same applies for the licking latch 25 and/or retention system 12.

The invention claimed is:

1. An electrically powered vehicle tailgate operator for pivoting a tailgate of a pickup truck about a horizontal tailgate axis near a bottom edge of the tailgate between a generally vertical closed position for prohibiting access to a pickup truck bed, and a generally horizontal open position for providing access to the pickup truck bed; the vehicle tailgate operator comprising a cable spool for spooling a cable by means of rotation about a spool axis, an electrical drive actuator for pivoting a drive shaft about a drive shaft axis, and a drive gear for transmitting motion and/or torque from the drive shaft to the cable spool, wherein at least the cable spool, the drive actuator, the drive shaft and the drive gear are arranged inside of a housing, wherein the spool axis is oriented in parallel to the drive shaft axis and the spool axis is arranged on a same height or above the drive shaft axis, and wherein the vehicle tailgate operator is placed inside of the housing with a rectangular or square shape that extends longitudinal in a vertical direction for forming a rear side edge of the pickup truck bed, and the housing acts as a stop surface for the tailgate in the closed position.

2. The electrically powered vehicle tailgate operator of claim 1, wherein the drive gear comprises a gear tooth wheel that is mounted on the drive shaft and/or arranged between the drive actuator and a ratch wheel of a retention system.

3. The electrically powered vehicle tailgate operator of claim 1, wherein the cable spool comprising a spool shaft for fixating and spooling the cable, a first side wall disk and a second side wall disk connected through the spool shaft, wherein the spool shaft and both side wall disks being aligned along the spool axis, wherein both side wall disks having approximately the same diameter and/or one of the side wall disks having radial teeth for engaging with a gear tooth wheel.

4. The electrically powered vehicle tailgate operator of claim 1, wherein a gear tooth wheel has less than half, less than a third or less than a quarter of the diameter of a side wall disk of the cable spool with radial teeth for engaging with the gear tooth wheel.

5. The electrically powered vehicle tailgate operator of claim 1, wherein a spool shaft of the cable spool is shorter than the drive shaft and/or the spool shaft having approximately a same diameter as the drive shaft.

6. The electrically powered vehicle tailgate operator of claim 1, wherein the spool axis can be arranged in the upper half or upper third of a height of a pickup truck bed for enabling the cable to pass through a small sized hole in the housing for connecting to the tailgate.

7. The electrically powered vehicle tailgate operator of claim 1, wherein a locking latch is provided for locking the tailgate in closed position and/or which is releasable through an electrical actuator.

8. The electrically powered vehicle tailgate operator of claim 1, wherein the vehicle tailgate operator comprises a control unit and/or a sensor for recognizing the tailgate when reaching the closed position in order to deactivate the drive actuator and/or to activate retention or locking of the tailgate in the closed position.

9. The electrically powered vehicle tailgate operator of claim 1, wherein the vehicle tailgate operator comprises a switch for opening and/or closing the tailgate.

10. The electrically powered vehicle tailgate operator of claim 1, wherein the vehicle tailgate operator is connected to a vehicle central locking system for closing and/or locking or retaining the tailgate when activating central locking of the vehicle.

11. An electrically powered vehicle tailgate operator for pivoting a tailgate of a pickup truck about a horizontal tailgate axis near a bottom edge of the tailgate between a generally vertical closed position for prohibiting access to a pickup truck bed, and a generally horizontal open position for providing access to the pickup truck bed; the vehicle tailgate operator comprising a cable spool for spooling a cable by means of rotation about a spool axis, an electrical drive actuator for pivoting a drive shaft about a drive shaft axis, and a drive gear for transmitting motion and/or torque from the drive shaft to the cable spool, wherein at least the cable spool, the drive actuator, the drive shaft and the drive gear are arranged inside of a housing, wherein the spool axis is oriented in parallel to the drive shaft axis and the spool axis is arranged on a same height or above the drive shaft axis, wherein the vehicle tailgate operator further comprises a retention system for retaining and/or locking the tailgate in the closed position, the retention system comprising a ratch wheel, a retention lever for interlocking the ratch wheel and an electrical retention actuator for pivoting the retention lever.

12. The electrically powered vehicle tailgate operator of claim 11, wherein the retention actuator of the retention system is connected to a control unit of the vehicle tailgate operator in such way that the tailgate is retained when the tailgate cannot be pivoted further towards the vertical close position.

13. The electrically powered vehicle tailgate operator of claim 11, wherein the retention lever of the retention system rotates about a retention lever axis, which is arranged between and/or approximately centered between the ratch wheel and the retention actuator.

14. The electrically powered vehicle tailgate operator of claim 11, wherein the retention actuator provides a linear motion and/or force, which transmitted to an end of the retention lever, and/or the retention lever mounted at the housing of the vehicle tailgate operator.

15. The electrically powered vehicle tailgate operator of claim 11, wherein the ratch wheel, the retention lever for interlocking the ratch wheel and the electrical retention actuator of the retention system are placed inside of the housing of the vehicle tailgate operator and/or the ratch wheel is mounted on the drive shaft of the drive actuator.

16. The electrically powered vehicle tailgate operator of claim 11, wherein the retention lever is longitudinally extending and/or has a hook-shaped or J-shaped end for directly engaging with the ratch wheel for prohibiting rotation of the tailgate towards open position.

17. The electrically powered vehicle tailgate operator of claim 11, wherein the ratch wheel of the retention system comprises teeth which have a proximate triangular shape with two opposed tooth flanks, wherein a first tooth flank is arranged ahead of a second tooth flank of the same tooth in a closing rotation direction of the ratch wheel towards a closed position of the tailgate, wherein the first tooth flank and/or the second tooth flank are tilted opposed to the closing rotation direction.

18. The electrically powered vehicle tailgate operator of claim 11, wherein the retention actuator is activated to transmitting motion and/or forces to the retention lever for engaging with the ratch wheel for prohibiting pivoting of the cable spool in opening rotation direction, and/or the retention actuator is deactivated to transmitting motion and/or forces to the retention lever for disengaging from the ratch wheel for allowing free pivoting of the cable spool in both rotation directions.

19. The electrically powered vehicle tailgate operator of claim 18, wherein the activated retention actuator still allows reciprocally pivoting of the retention lever during rotation of the ratch wheel in closing rotation direction.

* * * * *